Dec. 28, 1948.    R. T. COFFEY    2,457,210
CLUTCH
Filed Oct. 1, 1947    2 Sheets-Sheet 1
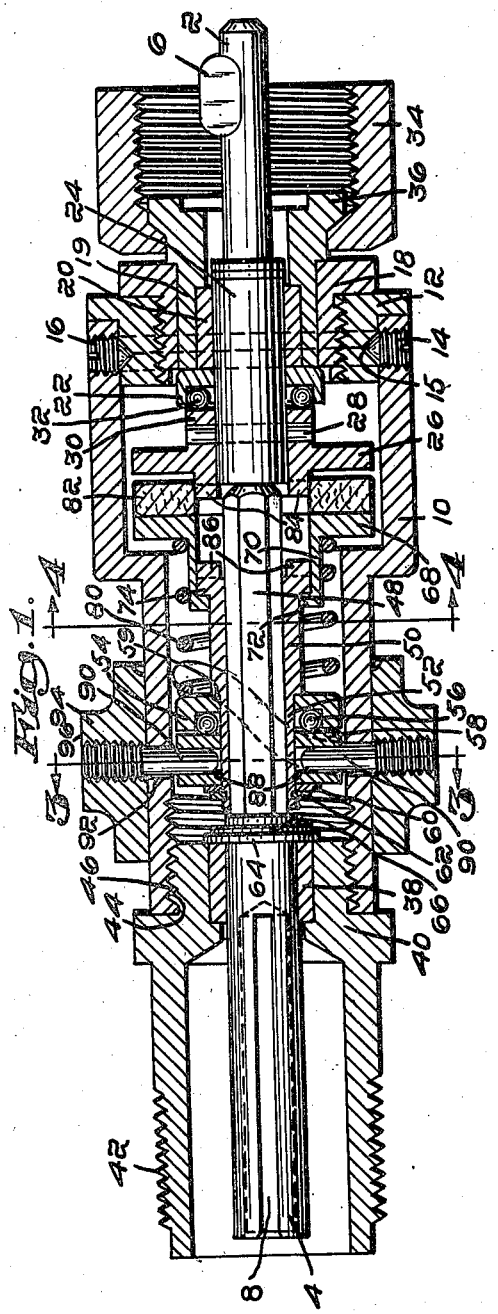
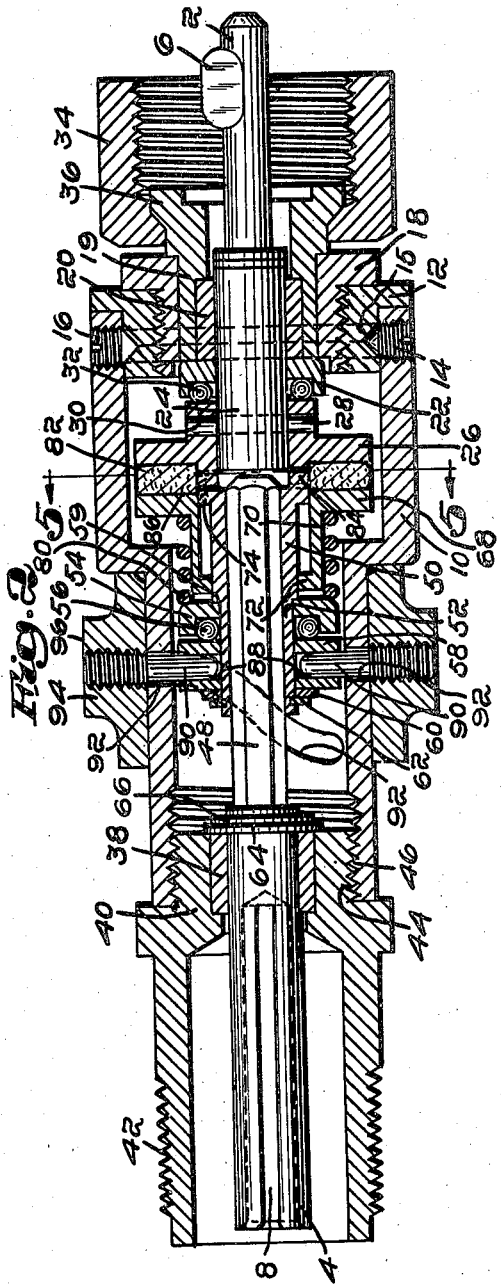
Inventor:
Roger T. Coffey,
by Yardley Chittick
Attorney Dec. 28, 1948.   R. T. COFFEY   2,457,210
CLUTCH
Filed Oct. 1, 1947   2 Sheets-Sheet 2

Inventor:
Roger T. Coffey,
by Chandley Chittick
Attorney

Patented Dec. 28, 1948

2,457,210

UNITED STATES PATENT OFFICE 2,457,210

CLUTCH

Roger T. Coffey, Marblehead, Mass., assignor to Barbour Stockwell Company, Cambridge, Mass., a corporation of Massachusetts Application October 1, 1947, Serial No. 777,165

1 Claim. (Cl. 192—53)

This invention relates to clutches, and is particularly concerned with a clutch adapted to be inserted in the line between a prime mover and a tachometer or other shaft operated type of counter or indicator.

Tachometer installations are commonly found in industry wherever it is desired to know the rate of rotation of a revolving element. In the typical situation, the tachometer operates continuously with the prime mover and is available to supply information as to the speed at all times.

In those cases, however, where only an occasional reading is made, it is desirable to disconnect the tachometer temporarily from the rotating part. To effect such disconnection, a clutch may be introduced in the line. Heretofore attempts have been made to use clutches of one type or another, but for several reasons they have not come into general use, even though such an arrangement has been sought by tachometer users.

One of the shortcomings of clutches heretofore used in this connection has been their failure to provide for gradual engagement. Thus the torsional load has been applied too rapidly. The shafts and flexible cable used with tachometers and the tachometer parts themselves are relatively delicate, and it is essential, to avoid damage, that the rotating members be brought up to speed gradually.

A further hazard in the use of a clutch in a tachometer line is the possibility of slippage. It is therefore necessary that a suitable clutch must include not only means for applying the load gradually, but also means for insuring that there will be no slippage after the clutch has been fully engaged.

Accordingly, the clutch of the present invention includes as major elements of novelty manually operated means, so designed as to insure the gradual engagement of the clutch elements so that the tachometer comes up to speed without overloading either the tachometer shaft or the tachometer mechanism.

The invention further provides for positive engagement of the driving and driven shafts so that there can be no slippage after the clutch has become fully engaged. It hardly needs to be pointed out that where the revolutions are being counted or the rate is indicated, a slipping clutch would render a tachometer or other indicator valueless.

The nature of the invention will be more particularly understood as the description proceeds with the aid of the accompanying drawings, in which Fig. 1 is a longitudinal sectional view showing the clutch disengaged.

Fig. 2 is a view similar to Fig. 1, showing the clutch fully engaged.

Figure 3:
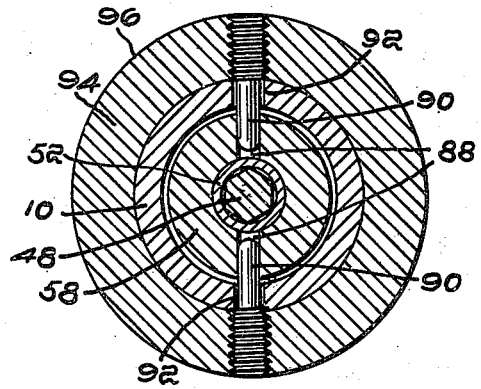
Fig. 3 is a section on the line 3—3 of Fig. 1.

The two parts to be connected by the clutch are the driving shaft 2 and the driven shaft 4. These parts are conventional. The right end of shaft 2 and its fin 6 are adapted to fit within a tubular slotted shaft similar to shaft 4, whose rotations are to be counted or indicated. Shaft 2 therefore provides positive means for engaging the prime mover without slippage. Shaft 4 is tubular at its left end, having a slot 8 along one side, which slot is adapted to receive the end of the tachometer shaft having a fin similar to the fin 6 on shaft 2.

Shafts 2 and 4 are mounted on bearings within a main cylindrical housing 10. At the right end is an internally threaded bushing 12, securely anchored in position by oppositely disposed set screws 14 and 16, the points of which are received by a circumferential V-shaped groove 15. Threaded into bushing 12 is another small bushing 18 which carries bearing bushing 19 and bearing 20. A ball race 22, part of the clutch thrust bearing, rests against the end of bushing 19.

Shaft 2 is connected to a larger shaft 24 which is supported by and rotates within bearing 20. A clutch plate 26 is fixed to shaft 24 by a transversely extending pin 28, which passes through the collar 30, an integral part of plate 26. The flat end of collar 30 bears against the balls 32 carried by ball race 22. This arrangement provides for the absorption of end thrust against clutch plate 26.

In order that shaft 2 may be held in proper relation with the prime mover, there is provided an internally threaded coupling nut 34, rotatable on the flared end 36 of the bearing carrying bushing.

From the explanation thus far, it is clear that when shaft 2 is rotated there will be positive rotation of clutch plate 26.

Driven shaft 4 rotates within bearing 38 which is maintained in a housing extension 40. One end of this housing is externally threaded at 42 to receive the connecting nut on the end of the flexible shaft which is to be affixed thereto.

The other end of housing 40 is threaded externally at 44 to engage the internal threads 46 at the left end of the main housing 10. The right hand end of shaft 4 is hexagonal as at 48 to fit within a corresponding hexagonal bore in sleeve 50. The left hand end of sleeve 50 is somewhat reduced in diameter at 52 to receive and maintain in position a thrust bearing assembly consisting of a race 54 with balls 56 and the flat bearing 58. These parts are held in place against shoulder 59 by washer 60 and the snap ring 62. Longitudinal movement of shaft 4 to the left is precluded by a snap ring 64 which has between it and the end of bearing 38 a washer 66.

Figure 4:
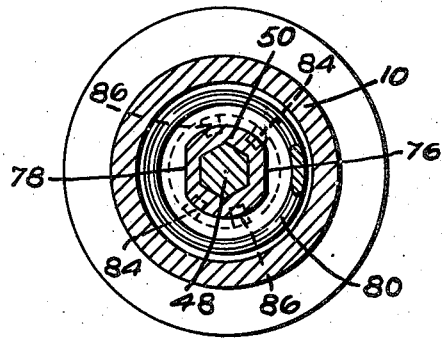
Fig. 4 is a section on the line 4—4 of Fig. 1.

A clutch plate 68 oppositely opposed to clutch plate 26 is carried by a collar 70 having an inturned circular flange 72 which flange overlaps and engages an outturned flange 74 on the end of sleeve 50. As will be seen in Fig. 4, the external surface of sleeve 50 is flattened on opposite sides at 76 and 78 and the internal configuration of flange 72 is shaped to conform to the flattened exterior of sleeve 50. By this arrangement collar 70 may be slid longitudinally of sleeve 50 while relative rotation is prevented.

A helical spring 80 positioned between race 54 and clutch plate 68 normally maintains the parts in the position shown in Fig. 1. That is to say, flanges 72 and 74 are in engagement, and clutch plate 68 and race 54 are a maximum distance apart.

Shaft 4 extends beyond the right end of sleeve 50 to provide a bearing surface for the sleeve as the latter may be slid therealong. As there is no end thrust applied to shaft 4, any engagement with the end of shaft 4 will not affect the clutch operation. Between the faces of clutch plates 26 and 68 is a friction disc 82 which provides for smooth and gradual application of the rotative force as the clutch is engaged. In the engagement of the clutch axial movement of race 54 moves clutch plate 68 and disc 82 to the right until the right-hand face of the disc engages the face of clutch plate 26. Thereafter, as movement of race 54 to the right continues, spring 80 is compressed to apply an increasing pressure between the clutch plates and the intermediate friction disc 82. In this manner the driven clutch 68 is smoothly and gradually accelerated by the driving clutch plate 26. In Fig. 1 the friction disc is shown as being against clutch plate 68, but in use, when the clutch is disengaged, it may wander any place between the separated clutch plate faces.

Extending to the left from clutch plate 26 are a pair of diametrically opposed teeth or lugs 84. A corresponding pair of lugs 86 extend from the face of flange 74. The purpose of these lugs is to enable the clutch to make final positive engagement in a manner that will hereinafter be explained.

From the description thus far, it is believed clear that with the parts in the position shown in Fig. 1, shaft 2 may be rotated without causing any corresponding rotation of shaft 4. The mechanism for causing engagement of the clutch will now be described.

Figure 6:
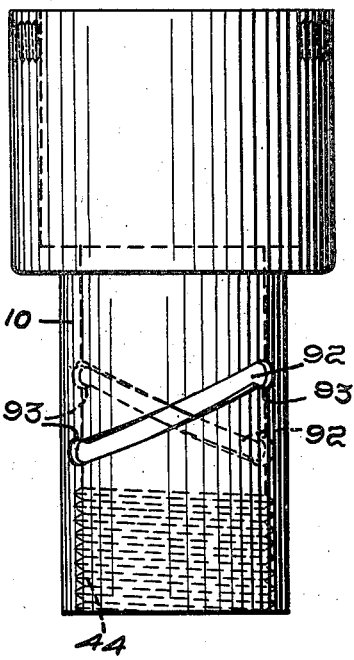
Fig. 6 is a side elevation of the principal housing with the other parts removed.

Two diametrically opposed holes 88 are provided in bearing 58. These holes are adapted to receive a pair of pins 90, which extend outwardly through the opposed spiral slots 92 shown in Fig. 6. The outer ends of pins 90 are threaded into a rotatable collar 94. It is believed apparent that as collar 94 is rotated with respect to housing 10, pins 90, sliding through slots 92, will cause the collar to move longitudinally of the housing and in so doing, will move bearing 58, sleeve 50 and clutch plate 68. Pins 90, as viewed in Fig. 1, are at the bottom position of slots 92, as viewed in Fig. 6. As collar 94 is rotated counterclockwise to be moved to the position shown in Fig. 2, carrying with it the thrust bearing unit, spring 80 is compressed and clutch plate 68 is driven to the right to bring friction disc 82 into engagement with both clutch plate faces. As rotation of collar 94 proceeds from the initial position in Fig. 1 to the final position in Fig. 2, the frictional engagement between the clutch faces gradually increases. Thus the rotative force transmitted by the clutch is gradually and progressively increased as spring 80 is compressed more and more. In this way, the tachometer shaft and tachometer mechanism are gradually brought up to the speed of the prime mover. The application of the torsional force is so gradual and the acceleration so low that possible damage to the tachometer is eliminated.

As previously mentioned, it is essential that when the clutch is in final engagement, provision be made to insure against any slippage. This is accomplished by the engagement of lugs 84 and 86, which, as shown in Fig. 2, are overlapping. That is to say, when pins 90 have reached the end of their travel in slots 92 and are locked there in the end notches 93, the position of sleeve 50 will be such that lugs 86 will engage with lugs 84.

Figure 5:
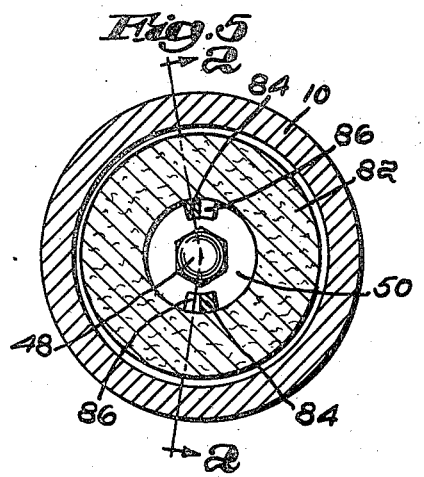
Fig. 5 is a section on the line 5—5 of Fig. 2.

Occasionally in the operation of the clutch, lugs 86 will happen to land on top of lugs 84, thereby preventing full movement of collar 94. In such case, it is merely necessary to back collar 94 off a few degrees and then resume the original movement. The probabilities of lugs 84 and 86 engaging endwise is very small, due to their small angular dimensions. When the clutch is initally engaged, lugs 84 and 86 might be in the position shown in Fig. 4. Thereafter, should any slippage between the clutch faces occur, then the lugs will come into engagement with each other as shown in Fig. 5, after which no further relative movement can occur.

In the commercial form in which this clutch has been made, collar 94, knurled on its exterior at 96, is of such dimensions that it normally would be clasped by the operator's thumb and first two fingers. The position of the unit on an engine or in any other typical installation is usually such that it is difficult for the operator to rotate collar 94 rapidly. That is to say, the character of the necesary manual operation required to bring the clutch faces together is such that rapid engagement is practically precluded. Thus, the construction provides for gradual application of torque to the driven shaft, as well as means for positively preventing slippage after the driven shaft has been brought up to speed.

In the construction heretofore described an annular friction disc 82 has been utilized between the clutch plate faces. This, of course, may be omitted so that the clutch plate faces engage directly. It is merely necessary that the faces be constructed to engage smoothly so that acceleration of the driven shaft is gradual as increasing pressure is applied to the clutch plates. A jerky or grabbing clutch should be avoided. Whatever the clutch construction, provision must be made to apply sufficient pressure to bring the speed of the driven clutch plate to, or substantially to, the speed of the driving plate to that engagement of the lugs 84 and 86 can take place without causing a sudden excesive load on the driven shaft.

While the invention has been disclosed in connection with a small clutch adapted to drive a tachometer or other relatively delicate instrument, it will be understood that if desired the parts may be enlarged to provide a clutch of whatever power is needed to carry the loads of any given installation.

While the invention has been disclosed with reference to a preferred form, it is not to be limited thereby, but only by the appended claim.

I claim:

A clutch comprising aligned driving and driven shafts, a first clutch plate affixed to said driving shaft, a thrust bearing supporting said driving shaft and clutch plate against movement away from said driven shaft, a sleeve longitudinally slidable on said driven shaft, mutually engageable members connected to said clutch plate and said sleeve so that, when said members are brought into engaging position by longitudinal movement of said sleeve, relative rotation of said clutch plate and said sleeve will be prevented, a second clutch plate carried by said sleeve whereby there may be relative longitudinal movement between said sleeve and said second clutch plate, means for preventing rotational movement between said driven shaft, said sleeve, and said second clutch plate, a second thrust bearing for exerting a force on said sleeve in the direction of said clutch plates, a compression spring between said second clutch plate and said second thrust bearing, and means for moving said second thrust bearing in the direction of said clutch plates whereby said clutch plates will be brought into engagement with each other, and after an increasing force has been applied to said clutch plates by the compression of said spring, continued movement of said second thrust bearing and said sleeve will bring said members into engaging position whereby any further rotational movement between said shafts will be precluded.

ROGER T. COFFEY.

REFERENCES CITED

The following references are of record in the file of this patent:

UNITED STATES PATENTS

| Number | Name | Date |
|---|---|---|
| 776,404 | Keyser | Nov. 29, 1904 |
| 835,721 | Winton et al. | Nov. 13, 1906 |
| 1,008,309 | Cushman | Nov. 14, 1911 |
| 1,041,010 | Brownnell | Oct. 15, 1912 |
| 1,096,052 | Plank | May 12, 1914 |
| 1,879,546 | Seibert et al. | Sept. 27, 1932 |
| 2,017,997 | Thomas | Oct. 22, 1935 |